United States Patent
Kao (10) Patent No.: US 8,571,305 B2
(45) Date of Patent: Oct. 29, 2013

(54) IMAGE PROCESSING DEVICE FOR ENHANCING STEREOSCOPIC SENSATION OF AN IMAGE USING A DEPTH IMAGE AND METHOD THEREOF

(75) Inventor: Meng-Chao Kao, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 804 days.

(21) Appl. No.: 12/563,166

(22) Filed: Sep. 21, 2009

(65) Prior Publication Data

US 2010/0284606 A1 Nov. 11, 2010

(30) Foreign Application Priority Data

May 8, 2009 (TW) ................................ 98115409 A (51) Int. Cl.
*G06K 9/00* (2006.01)

(52) U.S. Cl.
USPC ........... 382/154; 382/260; 382/261; 382/263; 382/264; 382/266

(58) Field of Classification Search
USPC ........................................................ 382/154
See application file for complete search history.

(56) References Cited

U.S. PATENT DOCUMENTS

| | | | | |
|---|---|---|---|---|
| 5,408,272 A * | 4/1995 | Barnett et al. | ................ | 348/585 |
| 5,764,871 A * | 6/1998 | Fogel | ................ | 345/427 |
| 5,975,697 A * | 11/1999 | Podoleanu et al. | ................ | 351/206 |
| 6,252,982 B1 * | 6/2001 | Haisma et al. | ................ | 382/154 |
| 6,496,598 B1 * | 12/2002 | Harman | ................ | 382/154 |
| 7,027,659 B1 * | 4/2006 | Thomas | ................ | 382/254 |
| 7,268,916 B2 * | 9/2007 | Kokemohr et al. | ................ | 358/1.9 |
| 7,512,262 B2 * | 3/2009 | Criminisi et al. | ................ | 382/154 |
| 7,643,672 B2 * | 1/2010 | Era | ................ | 382/154 |
| 7,804,533 B2 * | 9/2010 | Oshima | ................ | 348/246 |
| 7,899,315 B2 * | 3/2011 | Chou et al. | ................ | 396/77 |
| 8,170,358 B2 * | 5/2012 | Chen et al. | ................ | 382/244 |
| 2004/0027450 A1 * | 2/2004 | Yoshino | ................ | 348/42 |
| 2006/0188169 A1 * | 8/2006 | Tener et al. | ................ | 382/254 |
| 2006/0215881 A1 * | 9/2006 | Nakajima et al. | ................ | 382/106 |
| 2006/0291697 A1 * | 12/2006 | Luo | ................ | 382/104 |
| 2007/0146508 A1 * | 6/2007 | Oshima | ................ | 348/243 |
| 2007/0182995 A1 * | 8/2007 | Dolan | ................ | 358/3.08 |
| 2007/0223044 A1 * | 9/2007 | Bailey et al. | ................ | 358/3.06 |
| 2008/0226123 A1 * | 9/2008 | Birtwistle et al. | ................ | 382/100 |
| 2008/0226160 A1 * | 9/2008 | Birtwistle et al. | ................ | 382/154 |

(Continued)

FOREIGN PATENT DOCUMENTS

TW 200838287 9/2008

OTHER PUBLICATIONS

Trevor Darrell, "Pyramid Based Depth From Focus", Computer Vision and Pattern Recognition, 1988, p. 504-509.*

(Continued)

*Primary Examiner* — Gandhi Thirugnanam
(74) *Attorney, Agent, or Firm* — Jianq Chyun IP Office (57) ABSTRACT

An image processing device and a method thereof are provided. In the method, an original image and a corresponding depth image are received, wherein the depth image includes a plurality of depth values, and the depth values indicate depth of field of a plurality of blocks in the original image respectively. Further, each of the blocks is processed to obtain a corresponding smoothness and/or sharpness effect according to each of the depth values. Thereby, a stereoscopic sensation of the original image can be enhanced.

18 Claims, 7 Drawing Sheets

(56) References Cited

U.S. PATENT DOCUMENTS

| | | | |
|---|---|---|---|
| 2009/0109232 A1* | 4/2009 | Kerofsky | 345/589 |
| 2009/0162044 A1* | 6/2009 | Chou et al. | 396/89 |
| 2010/0284606 A1* | 11/2010 | Kao | 382/154 |
| 2011/0110602 A1* | 5/2011 | Hiraki et al. | 382/260 |
| 2011/0193860 A1* | 8/2011 | Lee et al. | 345/419 |
| 2012/0039525 A1* | 2/2012 | Tian et al. | 382/154 |
| 2012/0148142 A1* | 6/2012 | Ortyn et al. | 382/133 |

OTHER PUBLICATIONS

Fisher, S. Perkins, A. Walker and E. Wolfart., "Unsharp Filter", http://homepages.inf.ed.ac.uk/rbf/HIPR2/unsharp.htm, 2003, p. 1-10.*

Yen, Su-Rong, "Design and Implementation of an IBMR Based Image Relief System", Thesis of Master Degree of Zhe Jiang University, submitted on Mar. 2005, in which pp. 39 and 41 were cited.

"First Office Action of China Counterpart Application", issued on Oct. 9, 2010, p. 1-p. 4, in which the listed reference was cited.

* cited by examiner

IMAGE PROCESSING DEVICE FOR ENHANCING STEREOSCOPIC SENSATION OF AN IMAGE USING A DEPTH IMAGE AND METHOD THEREOF

CROSS-REFERENCE TO RELATED APPLICATION

This application claims the priority benefit of Taiwan application serial no. 98115409, filed on May 8, 2009. The entirety of the above-mentioned patent application is hereby incorporated by reference herein and made a part of specification.

BACKGROUND OF THE INVENTION

1. Field of the Invention

The invention generally relates to an image processing method. More particularly, the invention relates to an image processing method capable of enhancing stereoscopic sensation of an image.

2. Description of Related Art

Due to recent advancements, display technologies have evolved from planar displays to stereoscopic displays. A conventional stereoscopic display includes a front panel and a back panel. The front and back panels have a depth of field distance therebetween. The conventional stereoscopic display not only receives an original image, but a depth image corresponding to the original image is also received. The depth image includes a plurality of depth values for each of the objects in the original image. According to the depth image, the stereoscopic display determines whether to display each of the objects in the original image on the front or back panel. More specifically, the front panel is used for displaying each of the objects in the original image having a comparatively smaller depth value; conversely, the back panel is used for displaying each of the objects in the original image having a comparatively larger depth value. In this manner, the stereoscopic sensation of an image can be enhanced.

However, it is worth noting that the conventional stereoscopic display requires two panels, thereby increasing costs. Furthermore, since the stereoscopic display uses two panels, light provided by a backlight needs to penetrate two panels, and thus the image displayed may be substantially darker, or the image may have uneven brightness.

Moreover, other conventional techniques have been proposed to achieve a 3D mode of display. For example, a display can provide left eye images and right eye images simultaneously. An user can wear a pair of 3D glasses capable of using the grating effect in the glasses to filter images. By having the left eye receive the left eye image and the right eye receive the right eye image, a visual stereoscopic effect can be generated. However, it is inconvenient for the user to have a pair of 3D glasses.

SUMMARY OF THE INVENTION

Embodiments of the invention provide an image processing device and a method thereof for enhancing a stereoscopic sensation of an image.

Embodiments of the invention provide an image processing method, including receiving an original image and a depth image corresponding to the original image, in which the depth image comprises a plurality of depth values, and the depth values indicate a depth of field of a plurality of blocks in the original image, respectively. In addition, each of the blocks is processed according to each of the depth values to obtain a corresponding smoothness and/or sharpness effect.

In one embodiment of the invention, processing each of the blocks to obtain the corresponding smoothness and/or sharpness effect based on each of the depth values includes performing a smoothing process on the original image so as to obtain a smooth image. Additionally, a calculation of a difference value between the original image and the smooth image is performed so as to obtain a difference image. Furthermore, a weighted process is performed on the difference image, based on the weighting of the depth image, so as to obtain a detailed image. Moreover, an image addition process is performed between the smooth image and the detailed image so as to obtain an output image.

In one embodiment of the invention, the above-described processing of each of the blocks to obtain the corresponding smoothness and/or sharpness effect based on each of the depth values includes performing the smoothing process on the original image so as to obtain the smooth image. Additionally, the calculation of the difference value between the original image and the smooth image is performed so as to obtain the difference image. Furthermore, the weighted process is performed on the difference image, based on the weighting of the depth image, so as to obtain the detailed image. In addition, an image subtraction process is performed between the original image and the detailed image so as to obtain the output image.

In one embodiment of the invention, processing each of the blocks to obtain the corresponding smoothness and/or sharpness effect based on each of the depth values includes performing a sharpening process on the original image so as to obtain a sharp image. Additionally, the calculation of the difference value between the original image and the sharp image is performed so as to obtain the difference image. Furthermore, the weighted process is performed on the difference image, based on the weighting of the depth image, so as to obtain the detailed image. In addition, an image addition process is performed between the original image and the detailed image so as to obtain an output image.

In one embodiment of the invention, processing each of the blocks to obtain the corresponding smoothness and/or sharpness effect based on each of the depth values includes performing the sharpening process on the original image so as to obtain the sharp image. Additionally, the calculation of the difference value between the original image and the sharp image is performed so as to obtain the difference image. Furthermore, the weighted process is performed on the difference image, based on the weighting of the depth image, so as to obtain the detailed image. In addition, the image subtraction process is performed between the sharp image and the detailed image so as to obtain the output image.

In one embodiment of the invention, processing each of the blocks to obtain the corresponding smoothness and/or sharpness effect based on each of the depth values includes readjusting each of the depth values of the depth image, according to a predetermined focal length.

In another perspective, embodiments of the invention provide an image processing device including an image focusing unit. The image focusing unit can receive the original image and the depth image corresponding to the original image, in which the image focusing unit processes the blocks in the original image to obtain the corresponding smoothness and/or sharpness effect according to the depth values of the depth image, and each of the depth values respectively indicates a depth of field of each of the blocks in the original image.

In summary, embodiments of the invention receive the original image and the depth image corresponding to the original image, and according each of the depth values of the depth image, each of the blocks of the original image is processed to obtain the corresponding smoothness and/or sharpness effect. Therefore, a stereoscopic sensation of the original image can be enhanced.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A conventional stereoscopic display requires two panels, thereby increasing costs, decreasing brightness, and the brightness can be uneven. Accordingly, embodiments of the invention can perform a smoothing and/or a sharpening effect process on a plurality of blocks of an original image, based on a plurality of depth values of a depth image. Herein, each of the depth values represent a depth of field for each of the blocks, respectively. This technique is not only suitable to improve stereoscopic sensation for a plurality of flat panel displays, there is no decrease in brightness or uneven brightness.

In order to make the implementation of the spirit of the present invention more comprehensible, embodiments accompanied with drawings are described in detail below. Herein, like reference symbols indicate similar or same elements or steps. However, the invention may be implemented in other ways and is not limited to these examples.

Figure 1:
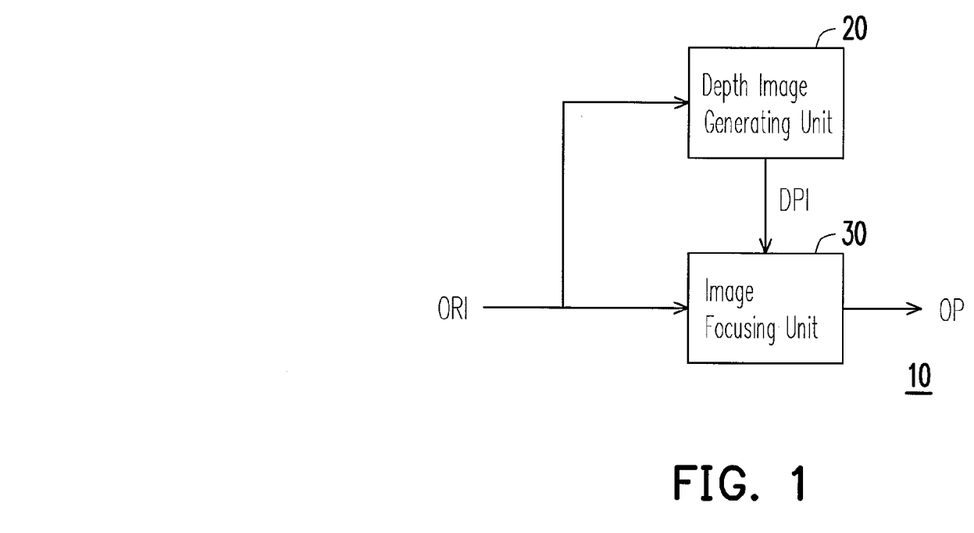
FIG. 1 is a schematic diagram illustrating an image processing device in accordance with one embodiment of the invention.

FIG. 1 is a schematic diagram illustrating an image processing device in accordance with one embodiment of the invention. Referring to FIG. 1, an image processing device 10 includes an image focusing unit 30. The image focusing unit 30 can receive an original image ORI and a depth image DPI corresponding to the original image ORI. According to a plurality of depth values of the depth image DPI, the image focusing unit 30 can perform a corresponding smoothing and/or a sharpening effect process on a plurality of blocks of the original image ORI. Herein, each of the aforementioned depth values represent a depth of field for each of the aforementioned blocks, respectively.

In the present embodiment of the invention, the depth image DPI can be generated by a depth image generating unit 20. The depth image generating unit 20 is coupled to the image focusing unit 30, and based on the original image ORI, the depth image generating unit 20 generates the corresponding depth image DPI for the image focusing unit 30, although the invention is not limited by this example. Further description is provided below in combination with a plurality of flowcharts and image schematic diagrams.

Figure 2:
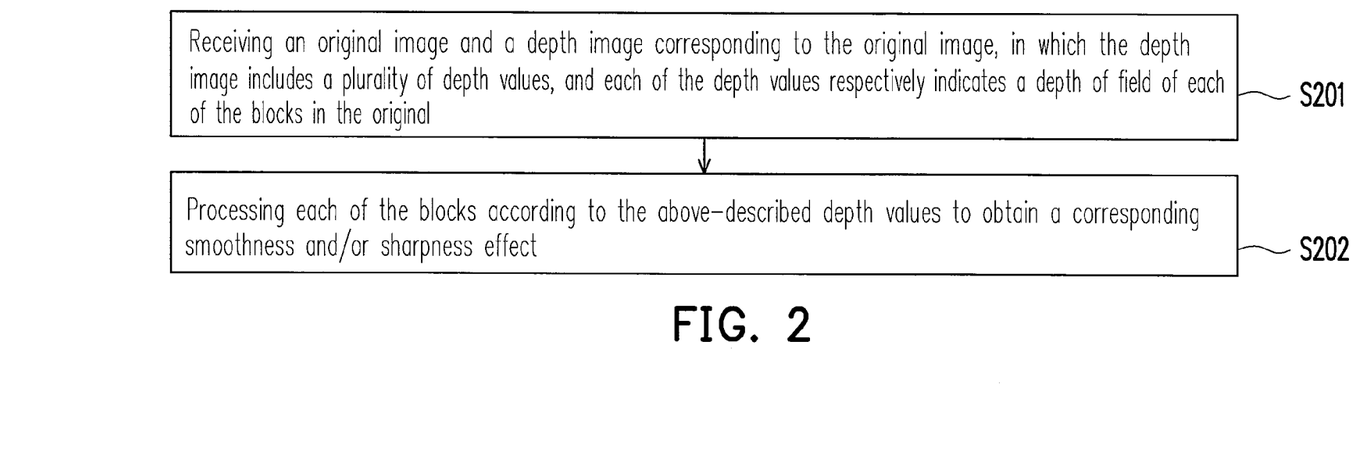
FIG. 2 is a flowchart illustrating an image processing method in accordance with one embodiment of the invention.
Figure 3:
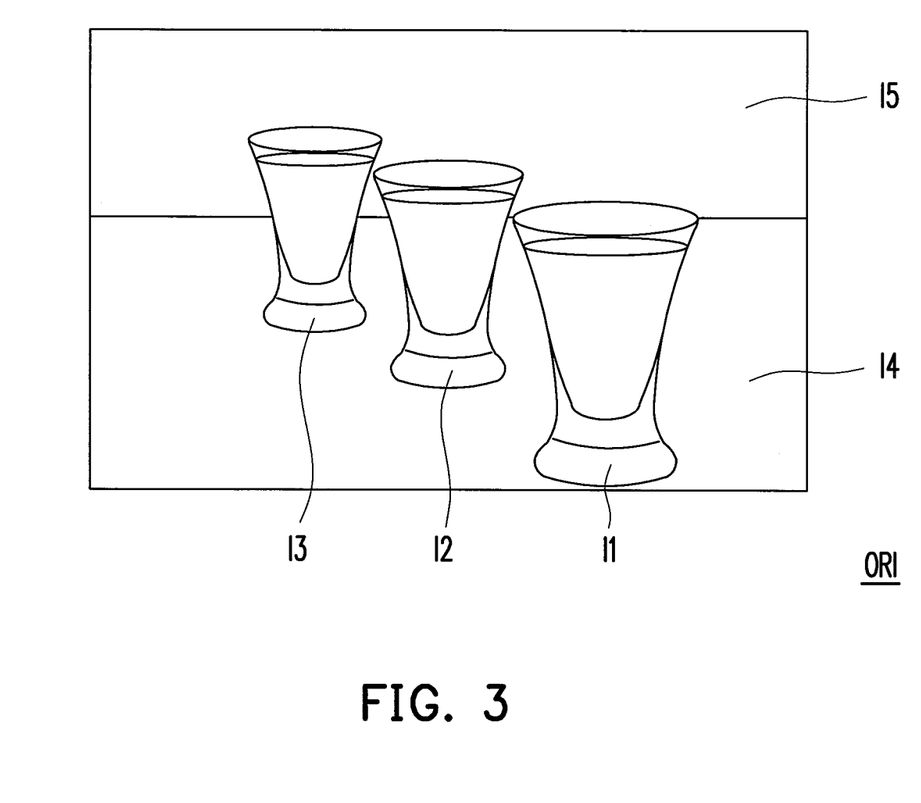
FIG. 3 is a schematic diagram illustrating an original image in accordance with one embodiment of the present invention.
Figure 4:
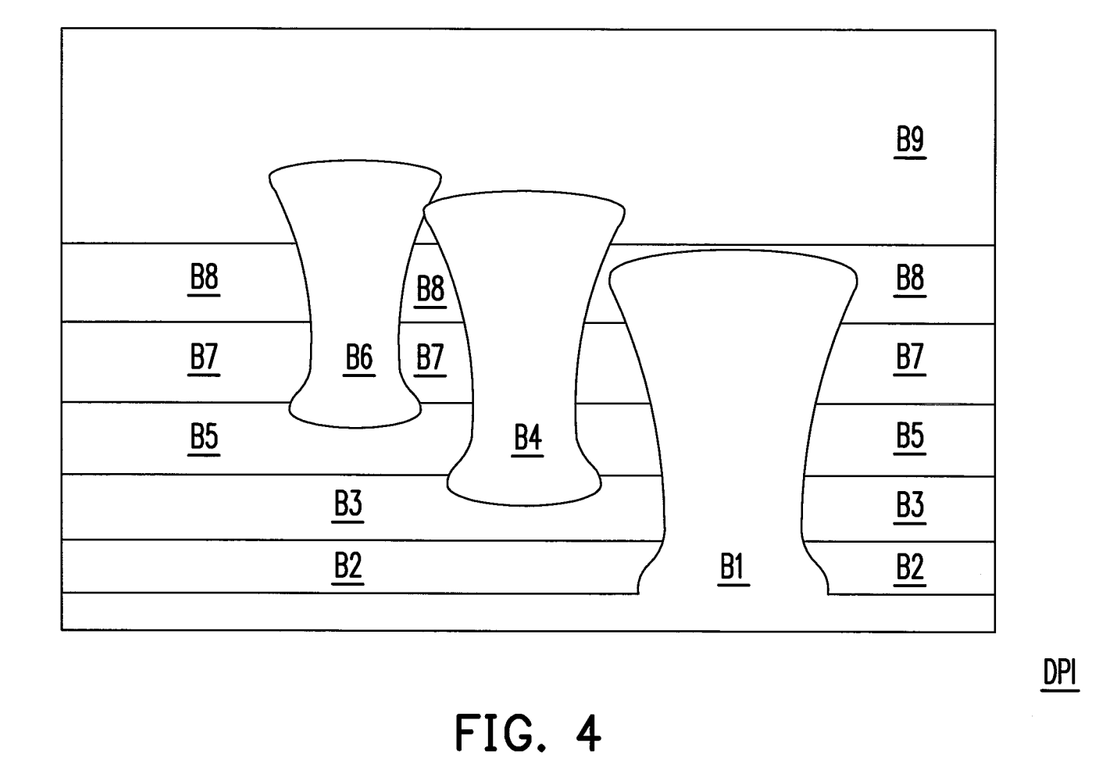
FIG. 4 is a schematic diagram illustrating a depth image in accordance with FIG. 3.

FIG. 2 is a flowchart illustrating an image processing method in accordance with one embodiment of the invention. FIG. 3 is a schematic diagram illustrating an original image in accordance with one embodiment of the present invention. FIG. 4 is a schematic diagram illustrating a depth image in accordance with FIG. 3. Referring to FIGS. 1, 2, 3, and 4, in FIG. 3, the original image ORI includes a plurality of cups I1-I3, a floor I4, and a wall I5. The cups I1-I3 are disposed on the floor I4. Additionally, a cup I3 is nearest to the wall I5, a cup I2 is next nearest to the wall I5, and the cup I1 is farthest away from the wall I5.

The depth image generating unit 20 can analyze a depth of field for each of a plurality of objects in the original image ORI, can generate a depth value for each of the objects in the original image ORI, and accordingly the depth image generating unit 20 can provide the depth image DPI to the image focusing unit 30. In the present embodiment of the invention, the depth image DPI can be partitioned into a plurality of block sets, respectively the 9 block sets B1-B9. The block sets B1-B9 has the depth value 1-9, respectively. In other words, from the perspective of an observer, a block set having a smaller depth value means the block set is closer to the observer; conversely, from the perspective of the observer, a block set having a larger depth value means the block set is farther away from the observer. Thereafter, a plurality of steps depicted in FIG. 2 can be processed on the original image ORI to further improve the stereoscopic sensation thereof.

Firstly, according to a step S201, the image processing unit 30 receives the original image ORI and the depth image DPI corresponding to the original image ORI. Thereafter, according to a step S202, each of the blocks in the original image ORI is processed to obtain a corresponding smoothness and/or sharpness effect, based on each of the depth values of the depth image DPI.

More specifically, each of the block sets B1-B9 in the original image ORI is processed to obtain the corresponding smoothness and/or sharpness effect. In the present embodiment of the invention, each of the block sets B1-B4 can be respectively processed to obtain a sharpness effect, in which the corresponding sharpness effect obtained for the block sets B1-B4 is respectively ordered from the sharpest to the least sharp. In addition, each of the block sets B5-B9 in the original image ORI can be processed to obtain a smoothness effect, in which the corresponding smoothness effect obtained for the block sets B5-B9 is respectively ordered from the least smooth to the smoothest.

An output image OP can be generated by the aforementioned steps. It is worth noting in the output image OP, an image block that is closer to the observer has a clearer image, whereas the image block farther away from the observer has a more blurry image. Since visually the output image OP is focused at an object closer to the observer, the stereoscopic sensation of the output image OP is enhanced. Moreover, the above-described image processing method can be used in planar displays such as the liquid crystal display, the organic light-emitting diode display, the projection apparatus, or the like. Problems in conventional stereoscopic displays such as decreased brightness and uneven brightness are not prevalent in the aforementioned image processing method.

It should be noted that, although the above embodiment has disclosed a possible implementation of the image processing device and the method thereof, it is common sense to persons of ordinary knowledge in this art that different manufacturers may develop different designs of image processing devices and the methods thereof, and the application of the invention should not be limited to this type only. In other words, the spirit of the invention is conformed as long as each of the blocks in the original image is processed to obtain a corresponding smoothness and/or sharpness effect, based on each of the depth values of the depth image. The following further provides some other embodiments to allow persons having ordinary skills in the art to recognize the spirit of the invention and to implement the invention.

Referring to FIGS. 1-4, in the above-described embodiment, although the step S202 processed each of the block sets B1-B4 to obtain the sharpness effect, and the step S202 also processed each of the block sets B5-B9 to obtain the smoothness effect, the invention is not limited by this example. Persons skilled in this art may vary the implementation of the step S202 according to their requirements. For example, in another embodiment of the invention, in step S202 the image focusing unit 30 can process each of the block sets B1-B9 in the original image ORI to obtain the sharpness effect, in which the corresponding sharpness effect obtained for the block sets B1-B9 is respectively ordered from the sharpest to the least sharp. Consequently, a similar effect is achieved.

For another example, in another embodiment of the invention, in step S202 the image focusing unit 30 can process each of the block sets B1-B9 in the original image ORI to obtain the smoothness effect, in which the corresponding smoothness effect obtained for the block sets B1-B9 is respectively ordered from the least smooth to the smoothest. Hence, a similar effect is also achieved in this manner.

Moreover, persons skilled in the art may choose to alter the focusing effect of the output image OP based on their requirements. For example, in another embodiment of the invention, in step S202 the image focusing unit 30 can process each of the block sets B1-B4 in the original image ORI to obtain the smoothness effect, in which the corresponding smoothness effect obtained for the block sets B1-B4 is respectively ordered from the smoothest to the least smooth. Additionally, the image focusing unit 30 can process each of the block sets B5-B9 in the original image ORI to obtain the sharpness effect, in which the corresponding sharpness effect for the block sets B5-B9 is respectively ordered from the least sharp to the sharpest. Since visually the output image OP is focused at an object farther away from the observer, the stereoscopic sensation of the output image OP is enhanced.

For another example, in step S202 the image focusing unit 30 can process each of the block sets B1, B2, B6-B9 in the original image ORI to obtain the smoothness effect, in which the corresponding smoothness effect obtained for the block sets B1 and B2 are respectively ordered from the smoothest to the least smooth, and the corresponding smoothness effect obtained for B6-B9 is respectively ordered from the least smooth to the smoothest. Additionally, the image focusing unit 30 can process each of the block sets B3-B5 in the original image ORI to obtain the sharpness effect, in which, the corresponding sharpness effect of the block set B4 is larger than the corresponding sharpness effect of the block sets B3 and B5. Consequently, the output image OP is focused at the cup I2, thereby enhancing the stereoscopic sensation of the output image OP.

In the above-described embodiment of the invention, the step S202 is a variable embodiment. In other examples, persons skilled in the art may choose to alter the implementation of the step S202 based on their requirements. For example, the image focusing unit 30 can process the original image ORI to obtain the smoothing effect in order to generate a smooth image. Thereafter, based on the depth image DPI, the original image ORI and the smooth image are merged according to their respective weightings. Consequently, a similar effect is also achieved in this manner.

In another embodiment of the invention, the image focusing unit 30 can process the original image ORI to obtain the sharpness effect in order to generate a sharp image. Thereafter, based on the depth image DPI, the original image ORI and the sharp image are merged according to their respective weightings. Consequently, a similar effect is also achieved in this manner.

Moreover, the image focusing unit 30 can process the original image ORI to obtain the sharpness effect in order to generate a sharp image. In addition, the image focusing unit 30 can process the original image ORI to obtain the smoothness effect in order to generate a smooth image. Thereafter, based on the depth image DPI, the original image ORI, the smooth image, and the sharp image are merged together according to their respective weightings. Consequently, a similar effect is also achieved in this manner.

In another perspective, persons skilled in the art may alter the structure of the image processing device depicted in FIG. 1 according to their requirements. For example, in another embodiment of the invention, the depth image DPI can be generated by an external device, or the depth image DPI can be defined when the original image ORI is generated. In other words, the image processing device 10 does not necessarily need to include the depth image generating unit 20; the image processing device 10 can directly receive the depth image DPI and process the original image ORI accordingly.

Figure 5:
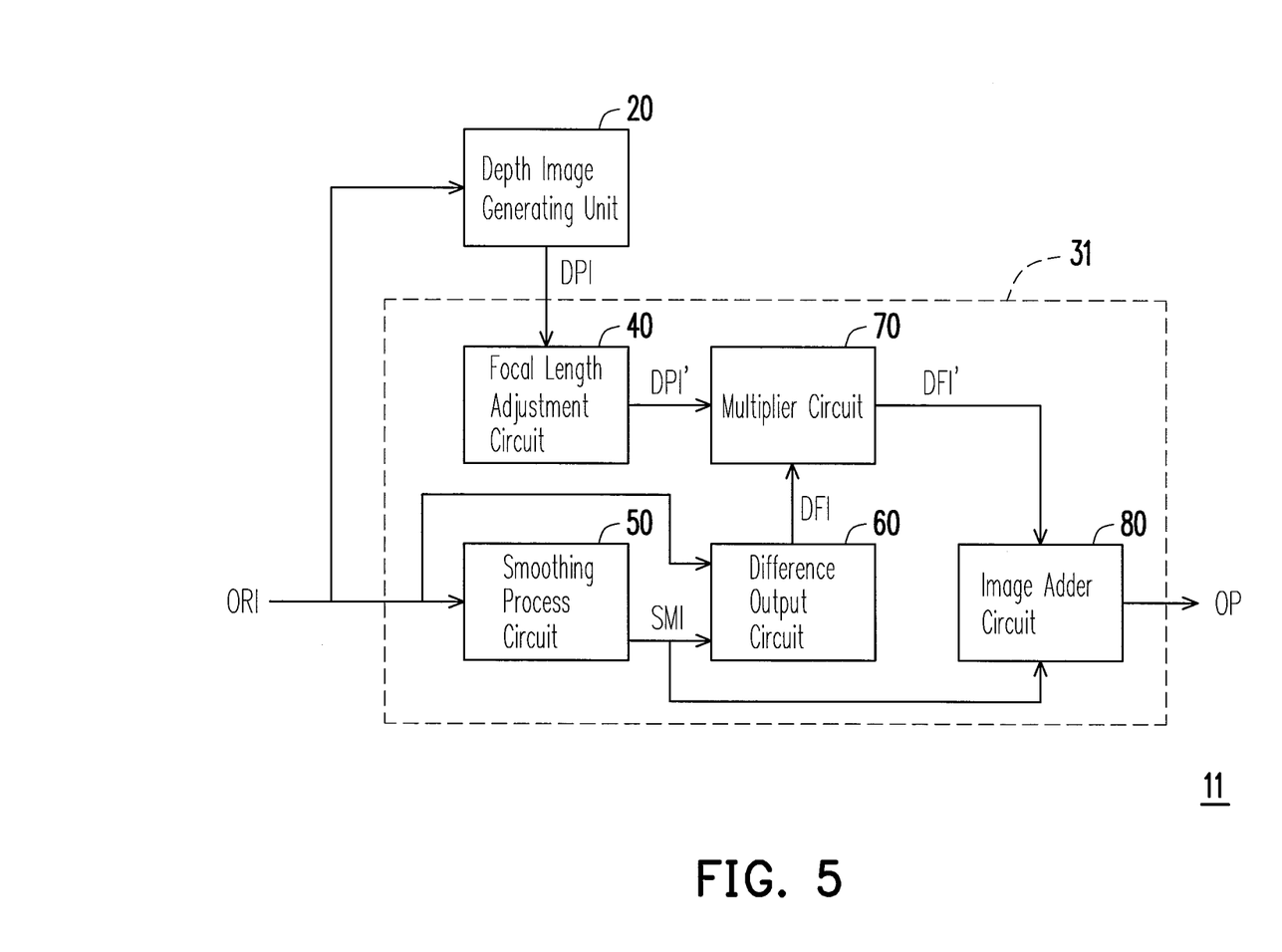
FIG. 5 is a schematic diagram illustrating the image processing device in accordance with another embodiment of the invention.

For another example, FIG. 5 is a schematic diagram illustrating the image processing device in accordance with another embodiment of the invention. As shown in FIG. 5, an image processing device 11 includes the depth image generating unit 20 and an image focusing unit 31. The image focusing unit 31 can include a focal length adjustment circuit 40, a smoothing process circuit 50, a difference output circuit 60, a multiplier circuit 70, and an image adder circuit 80. The difference output circuit 60 is coupled to the smoothing process circuit 50, the multiplier circuit 70, and the image adder circuit 80. The focal length adjustment circuit 40 is coupled to the depth image generating unit 20 and the multiplier circuit 70. The image adder circuit 80 is coupled to the multiplier circuit 70.

In light of the foregoing descriptions, the smoothing process circuit 50 can perform a smoothing process on the original image ORI and generate a smooth image SMI accordingly. The smoothing process circuit 50 can use a smoothing mask of 3×3 pixels to perform the smoothing process, although the invention is not limited by this implementation. In other embodiments of the invention, different implementations of the smoothing process can be used. The difference output circuit 60 can perform a difference calculation between the original image ORI and the smooth image SMI, and accordingly generate a difference image DFI. It should be noted that the difference image DFI can be viewed as a plurality of detailed differences between the original image ORI and the smooth image SMI. In another perspective, when the aforementioned detailed differences are added to the smooth image SMI, the original image is obtained; conversely, when the aforementioned detailed differences is subtracted from the original image ORI, the smooth image SMI is obtained.

In addition, the focal length adjustment circuit 40 can adjust each of the depth values of the depth image DPI based on a predetermined focal length. In the present embodiment of the invention for example, if visually the original image ORI is to focus on the cup I3, then the focal length adjustment circuit 40 can readjust the depth image DPI and generate a depth image DPI' after adjustment. The depth values of the block sets B1-B9 in the depth image DPI' can be respectively 1, 2, 3, 4, 5, 6, 5, 4, and 3.

Thereafter, the multiplier circuit 70 can use the depth image DPI' as a weighting to perform a weighting process on the difference image DFI so as to obtain a detailed image DFI'. More specifically, according to the depth image DPI', the multiplier circuit 70 can determine the amount of detail to conserve in each region of the difference image DFI. Conversely, according to the depth image DPI', the multiplier circuit 70 can determine the amount of detail to soften in each region of the difference image DFI.

Accordingly, in the present embodiment of the invention, the multiplier circuit 70 can multiply a grayscale value of each of the pixels of the block set B6 in the difference image DFI by 6/6. The multiplier circuit 70 can multiply the grayscale value of each of the pixels of the block sets B5 and B7 in the difference image DFI by 5/6. The multiplier circuit 70 can multiply the grayscale value of each of the pixels of the block sets B4 and B8 in the difference image DFI by 4/6. The multiplier circuit 70 can multiply the grayscale value of each of the pixels of the block sets B3 and B9 in the difference image DFI by 3/6. The multiplier circuit 70 can multiply the grayscale value of each of the pixels of the block set B2 in the difference image DFI by 2/6. The multiplier circuit 70 can multiply the grayscale value of each of the pixels of the block set B1 in the difference image DFI by 1/6. In this manner, the detailed image DFI' can be obtained.

Thereafter, the image adder circuit 80 adds the smooth image SMI and the detailed image DFI', and an output image OP is generated accordingly. It should be noted that the output image OP can be viewed as a combination of the original image ORI and the smooth image SMI. Each of the pixels corresponding to the block set B6 in the output image OP is combined from an heavier weighting of the original image ORI and a lesser weighting of the smooth image. SMI (e.g. 1:0). Each of the pixels corresponding to the block set B1 in the output image OP is combined from a lesser weighting of the original image ORI and an heavier weighting of the smooth image SMI (e.g. 1:5). In the same fashion, each of the pixels corresponding to the block sets B2-B5 and B7-B9 in the output image OP can be derived. Therefore, each of the pixels corresponding to the block set B6 in the output image OP is visually sharper; conversely, each of the pixels corresponding to the block set B1 in the output image OP is visually more blurry. Accordingly, the stereoscopic sensation of the output image OP can be enhanced, and visually the cup I3 is in-focused.

Figure 6:
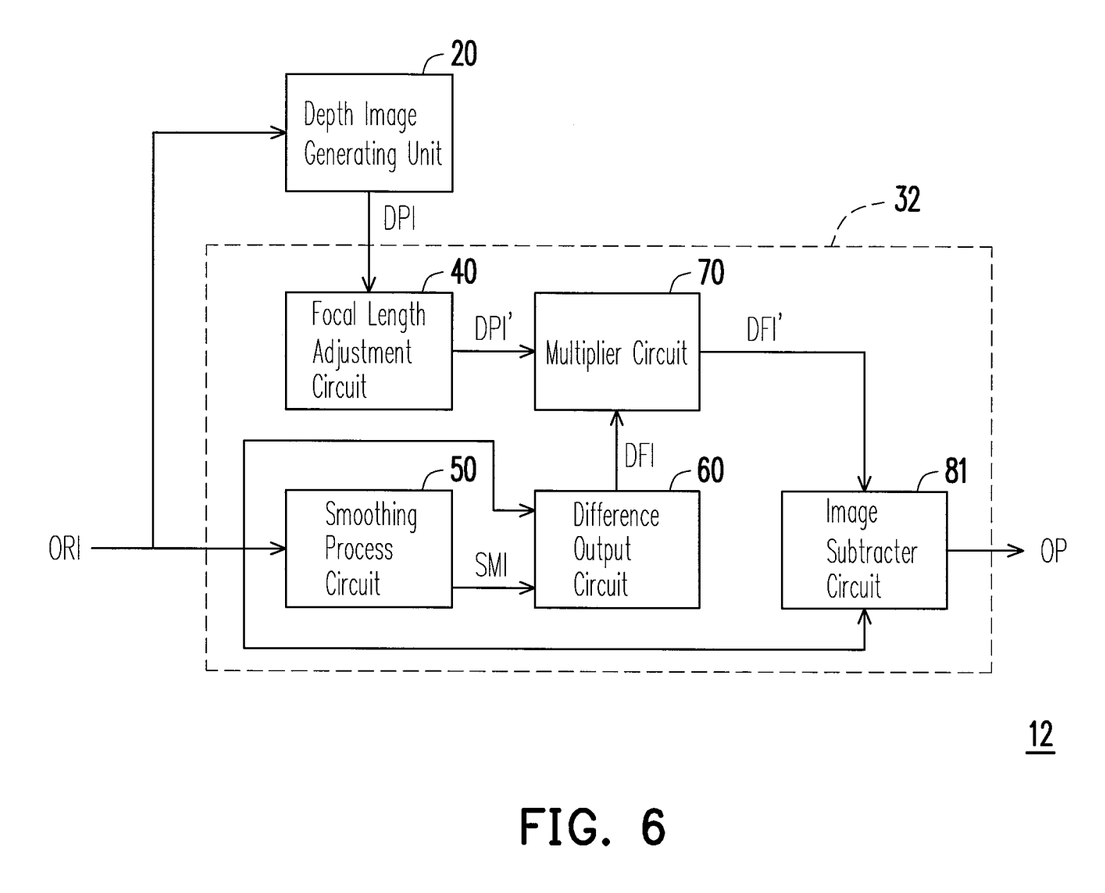
FIGS. 6-8 are schematic diagrams illustrating the image processing device in accordance with another embodiment of the invention.
Figure 7:
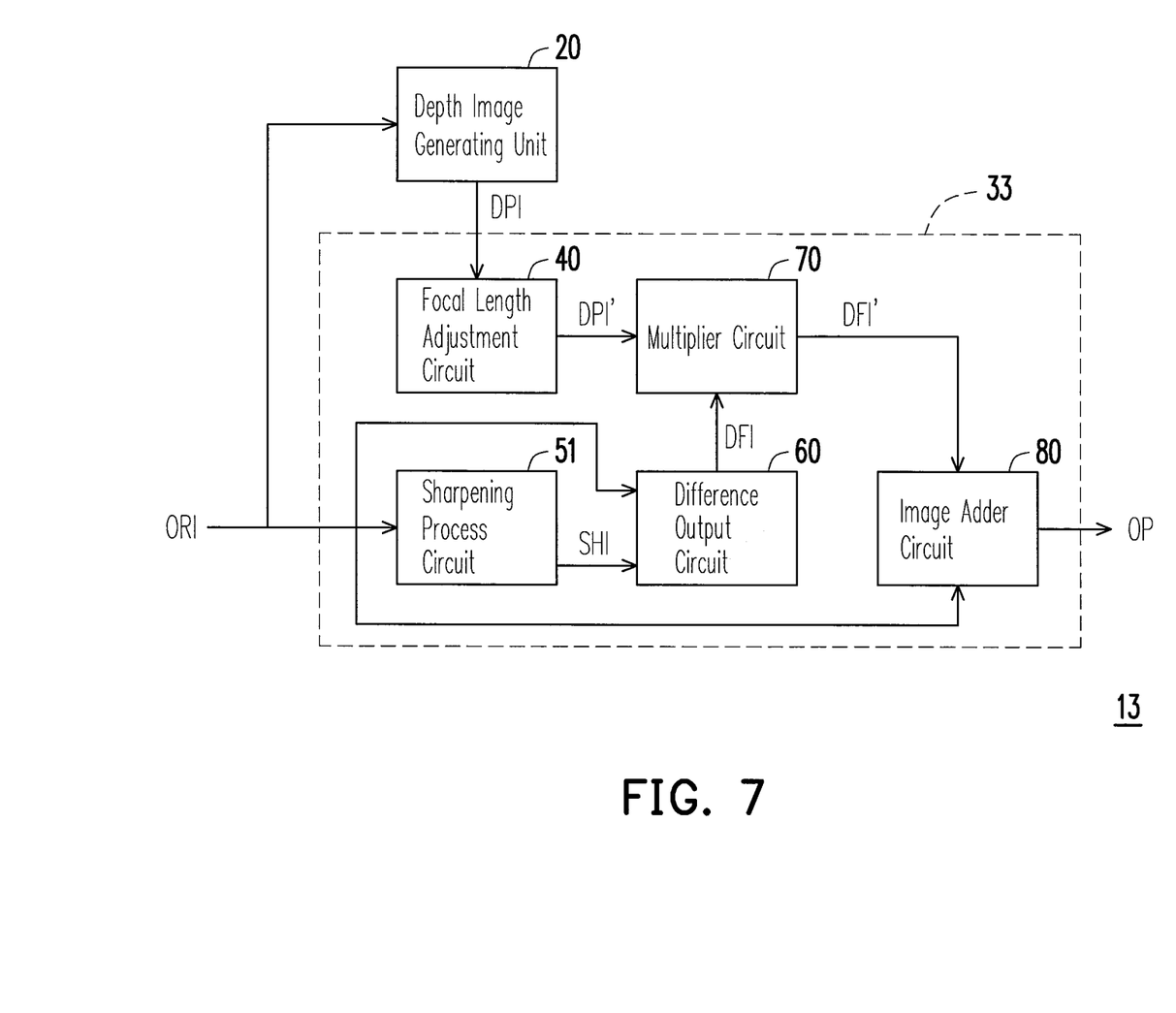
Figure 8:
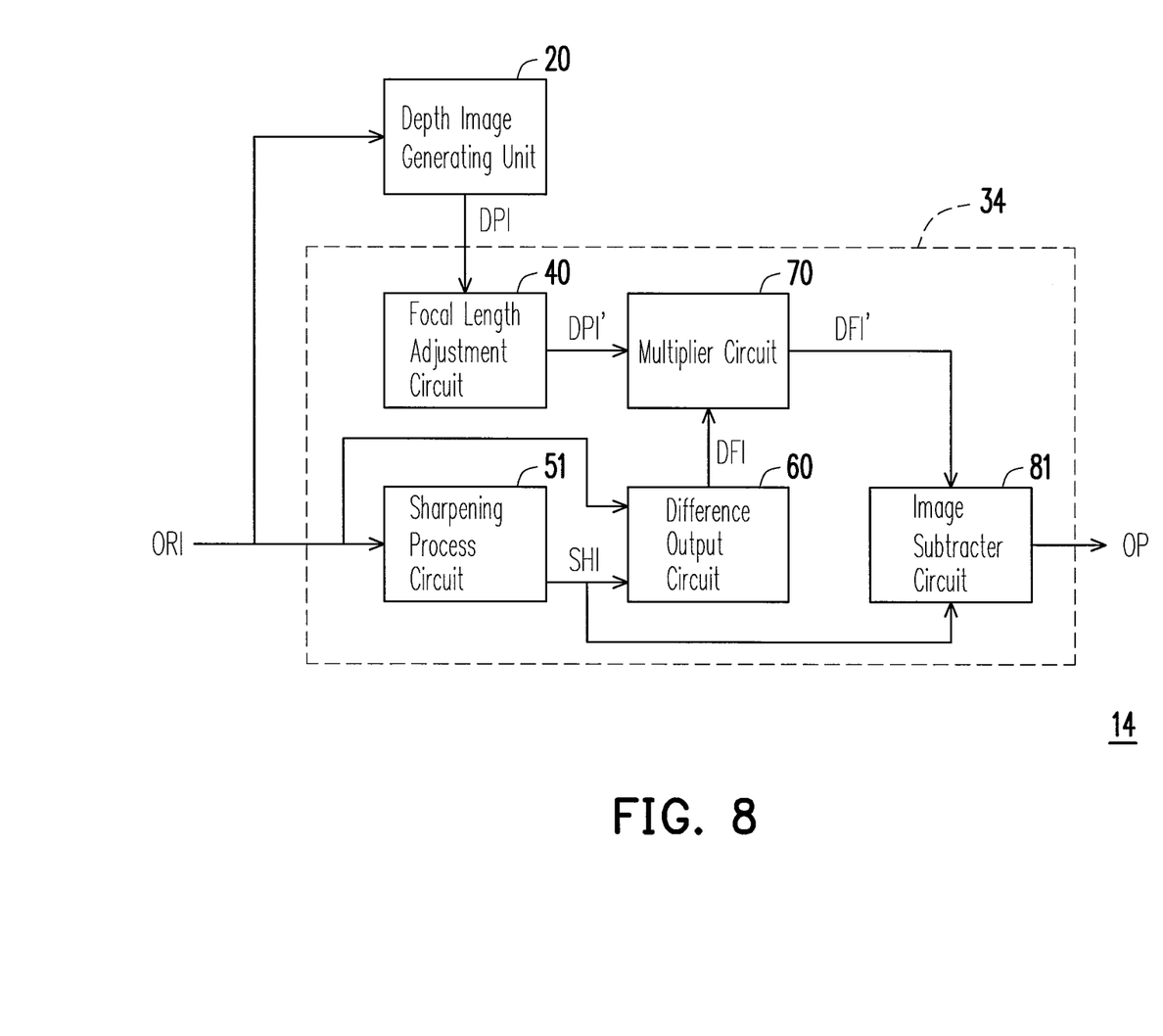

The schematic diagram of FIG. 5 merely depicts an optional embodiment, and the invention is not limited by this example. In another embodiment of the invention, the focal length adjustment circuit 40 can be abbreviated; the multiplier circuit 70 can directly make use of the depth image DPI. In another example, FIGS. 6-8 are schematic diagrams illustrating an image processing device in accordance with another embodiment of the invention. Referring to FIGS. 5-8, an image focusing unit 32 of an image processing device 12 depicted in FIG. 6 is similar to the image focusing unit 31 of the image processing device 11 depicted in FIG. 5. A difference is that FIG. 6 has an image subtracter circuit 81 to replace the image adder circuit 80 of FIG. 5. The image subtracter circuit 81 can perform an image subtraction process between the original image ORI and the detailed image DFI' so as to obtain the output image OP. This process allows an heavier weighted portion within each of the block sets of the output image OP to appear more blurry; conversely, a lesser weighted portion within each of the block sets of the output image OP appears clearer. In other words, a similar effect of the aforementioned embodiment can be achieved by adjusting the multiplier circuit 70 or the focal length adjustment circuit 40.

Moreover, an image focusing unit 33 of an image processing device 13 depicted in FIG. 7 is similar to the image focusing unit 31 of the image processing device 11 depicted in FIG. 5. A difference is that FIG. 7 has an sharpening process circuit 51 to replace the smoothing process circuit 50 of FIG. 5. The sharpening process circuit 51 can perform a sharpening process on the original image ORI, for instance using a sharpening mask of 3×3 pixels to perform the sharpening process so as to obtain the sharp image SHI, although the invention is not limited by this example. In other embodiments of the invention, different implementations of the sharpening process can be used. The image adder circuit 80 can perform an image addition process between the original image ORI and the detailed image DFI' so as to obtain the output image OP. This process allows an heavier weighted portion within each of the block sets of the output image OP to appear clearer; conversely, a lesser weighted portion within each of the block sets of the output image OP appears more blurry. A similar effect of the aforementioned embodiment is achieved.

Furthermore, an image focusing unit 34 of an image processing device 14 depicted in FIG. 8 is similar to the image focusing unit 31 of the image processing device 11 depicted in FIG. 5. A difference is that the FIG. 8 has an sharpening process circuit 51 to replace the smoothing process circuit 50 of FIG. 5. In addition, FIG. 8 has the image subtracter circuit 81 to replace the image adder circuit 80 depicted in FIG. 5. The sharpening process circuit 51 can perform the sharpening process on the original image ORI so as to obtain the sharp image SHI. The image subtracter circuit 81 can perform an image subtraction process between the detailed image DFI' and the sharp image SHI so as to obtain the output image OP. This process allows an heavier weighted portion within each of the block sets of the output image OP to appear more blurry; conversely, a lesser weighted portion within each of the block sets of the output image OP appears clearer. In other words, a similar effect of the aforementioned embodiment can be achieved by adjusting the multiplier circuit or the focal length adjustment circuit 40.

Accordingly, in embodiments of the invention, each of the blocks in the original image is processed to obtain a corresponding smoothness and/or sharpness effect, based on each of the depth values of the depth image. In this manner, the stereoscopic sensation of an image can be enhanced. Embodiments of the present invention may also have the following features:
1. Adjusting the depth values of the depth image so as to alter the visual in-focus position of the output image.
2. Using a plurality of combinations of the smoothing process circuit, the sharpening process circuit, the difference output circuit, the multiplier circuit, the image adder circuit, and the image subtracter circuit to generate a plurality of images formed by merging images of different weightings.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. An image processing method, comprising:
   receiving an original image and a depth image corresponding to the original image, wherein the depth image comprises a plurality of depth values, and each of the depth values respectively indicates a depth of field of each of a plurality of blocks in the original image; and
   processing the blocks to obtain a corresponding smoothness effect according to the depth values, comprising:
      performing a smoothing process on the original image so as to obtain a smooth image;
      calculating a difference value between the original image and the smooth image so as to obtain a difference image; and
      performing a weighted process on the difference image, based on a weighting of the depth image, so as to obtain a detailed image.

2. The image processing method as claimed in claim 1, wherein processing the blocks to obtain the corresponding smoothness effect according to the depth values further comprises:
   performing an image addition process between the smooth image and the detailed image so as to obtain an output image.

3. The image processing method as claimed in claim 1, wherein processing the blocks to obtain the corresponding smoothness effect according to the depth values further comprises:
   performing an image subtraction process between the original image and the detailed image so as to generate an output image.

4. The image processing method as claimed in claim 1, wherein processing the blocks to obtain the corresponding smoothness effect according to the depth values further comprises:
   adjusting the depth values of the depth image according to a predetermined focal length.

5. An image processing device, comprising:
   a processor;
   a memory coupled to the processor, wherein the memory stores program instructions executable by the processor;
   an image focusing unit, for receiving an original image and a depth image corresponding to the original image, wherein the image focusing unit processes a plurality of blocks in the original image to obtain a corresponding smoothness effect, according to a plurality of depth values of the depth image, and each of the depth values respectively indicate a depth of field of each of the blocks in the original image, wherein the image focusing unit comprises:
      a smoothing process circuit for performing a smoothing process on the original image so as to obtain a smooth image;
      a difference output circuit coupled to the smoothing process circuit, for calculating a difference value between the original image and the smooth image so as to obtain a difference image; and
      a multiplier circuit coupled to a difference output circuit, for performing a weighted process on a difference image based on a weighting of the depth image so as to obtain a detailed image.

6. The image processing device as claimed in claim 5, wherein the image focusing unit further comprises:
   an image adder circuit coupled to the multiplier circuit, for image adding the smooth image and the detailed image so as to obtain an output image.

7. The image processing device as claimed in claim 5, wherein the image focusing unit further comprises:
   an image subtracter circuit coupled to the multiplier circuit, for image subtracting the detailed image from the original image so as to obtain an output image.

8. The image processing device as claimed in claim 5, wherein the image focusing unit further comprises:
   a focal length adjustment circuit for adjusting the depth values of the depth image according to a predetermined focal length.

9. The image processing device as claimed in claim 5, further comprising:
   a depth image generating unit coupled to the image focusing unit, for generating the depth image according to the original image.

10. An image processing method, comprising:
    receiving an original image and a depth image corresponding to the original image, wherein the depth image comprises a plurality of depth values, and each of the depth values respectively indicates a depth of field of each of a plurality of blocks in the original image; and
    processing the blocks to obtain a corresponding sharpness effect according to the depth values, comprising:
       performing a sharpening process on the original image so as to obtain a sharp image;
       calculating a difference value between the original image and the sharp image so as to obtain a difference image; and
       performing a weighted process on the difference image, based on a weighting of the depth image, so as to obtain a detailed image.

11. The image processing method as claimed in claim 10, wherein processing the blocks to obtain the corresponding sharpness effect according to the depth values further comprises:
    performing an image addition process between the original image and the detailed image so as to obtain an output image.

12. The image processing method as claimed in claim 10, wherein processing the blocks to obtain the corresponding sharpness effect according to the depth values further comprises:
    performing the image subtraction process between the sharp image and the detailed image so as to obtain an output image.

13. The image processing method as claimed in claim 10, wherein processing the blocks to obtain the corresponding sharpness effect according to the depth values further comprises:
    adjusting the depth values of the depth image according to a predetermined focal length.

14. An image processing device, comprising:
    a processor;
    a memory coupled to the processor, wherein the memory stores program instructions executable by the processor;
    an image focusing unit, for receiving an original image and a depth image corresponding to the original image, wherein the image focusing unit processes a plurality of blocks in the original image to obtain a corresponding sharpness effect, according to a plurality of depth values of the depth image, and each of the depth values respectively indicate a depth of field of each of the blocks in the original image, wherein the image focusing unit comprises:
       a sharpening process circuit for performing a sharpening process on the original image so as to obtain a sharp image;

a difference output circuit coupled to the sharpening process circuit, for calculating a difference value between the original image and the sharp image so as to obtain a difference image; and a multiplier circuit coupled to a difference output circuit, for performing a weighted process on a difference image based on a weighting of the depth image so as to obtain a detailed image.

15. The image processing device as claimed in claim 14, wherein the image focusing unit further comprises:

an image adder circuit coupled to the multiplier circuit, for image adding the original image and the detailed image so as to obtain an output image.

16. The image processing device as claimed in claim 14, wherein the image focusing unit further comprises:

an image subtracter circuit coupled to the multiplier circuit, for image subtracting the detailed image from the sharp image so as to obtain an output image.

17. The image processing device as claimed in claim 14, wherein the image focusing unit further comprises:

a focal length adjustment circuit for adjusting the depth values of the depth image according to a predetermined focal length.

18. The image processing device as claimed in claim 14, further comprising:

a depth image generating unit coupled to the image focusing unit, for generating the depth image according to the original image.

* * * * *